Sept. 21, 1937.   C. R. CLOUGH   2,093,599
WATER STORAGE AND CIRCULATING SYSTEM FOR MOTOR VEHICLES
Filed Oct. 15, 1930   3 Sheets-Sheet 1
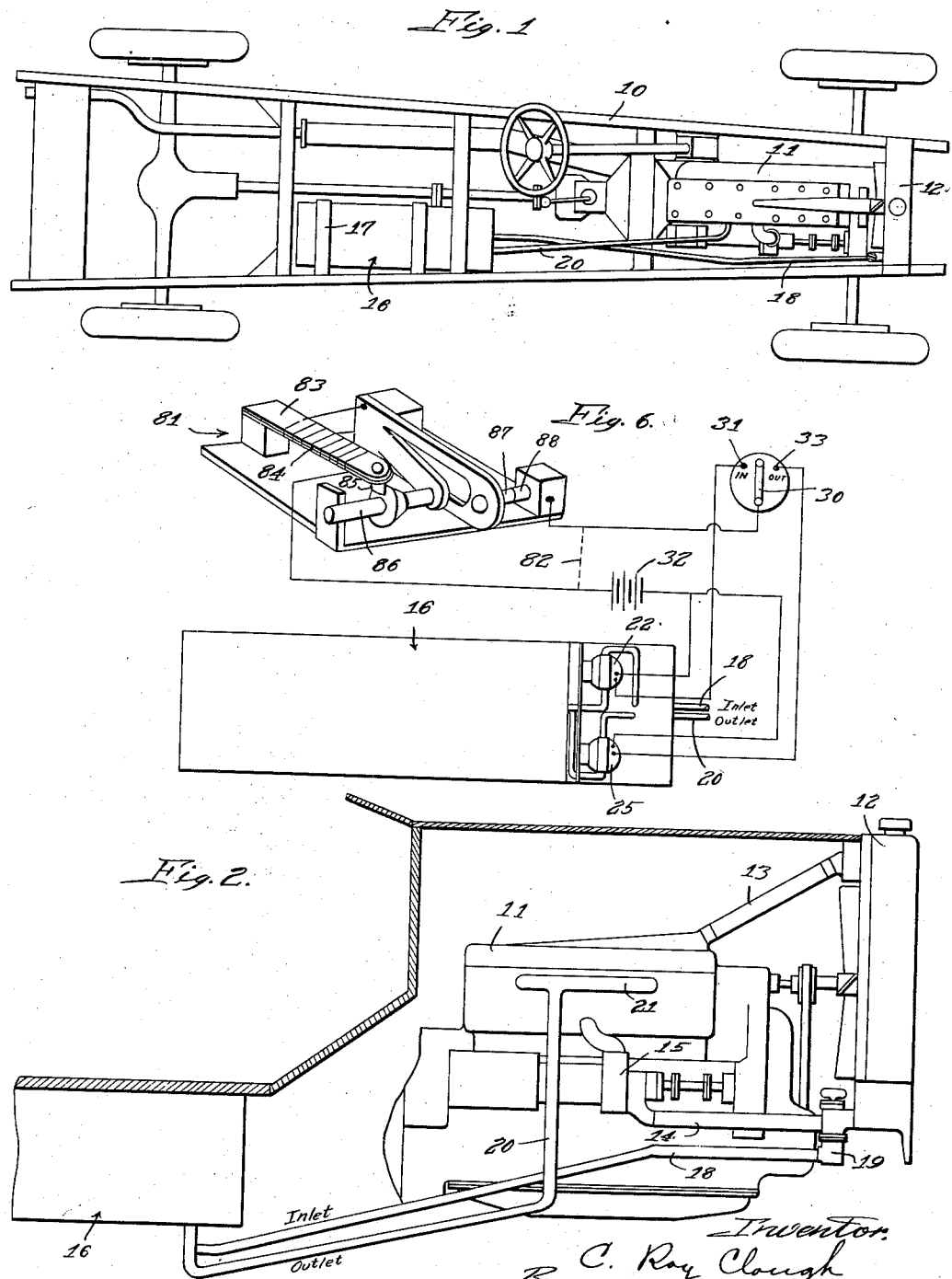

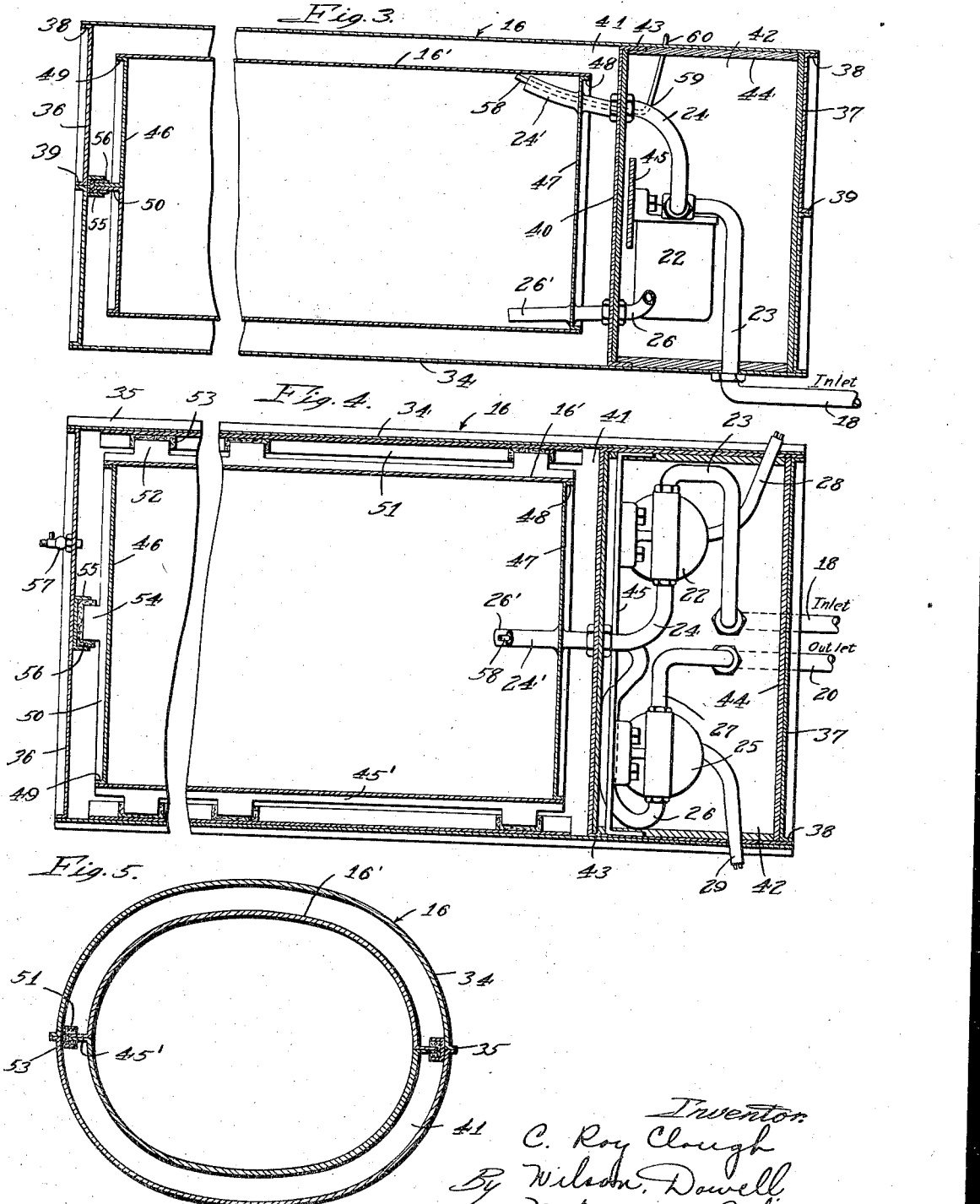

Sept. 21, 1937.  C. R. CLOUGH  2,093,599
WATER STORAGE AND CIRCULATING SYSTEM FOR MOTOR VEHICLES
Filed Oct. 15, 1930   3 Sheets-Sheet 3
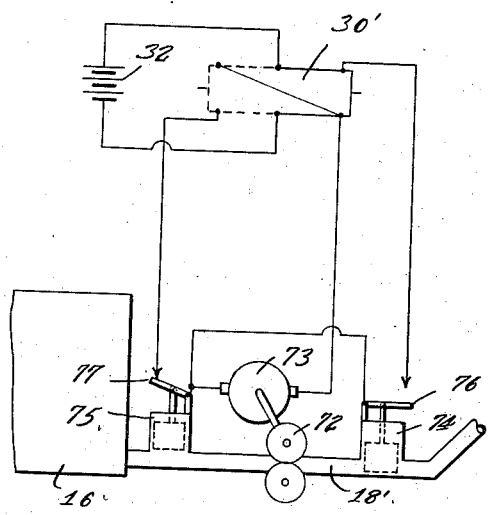
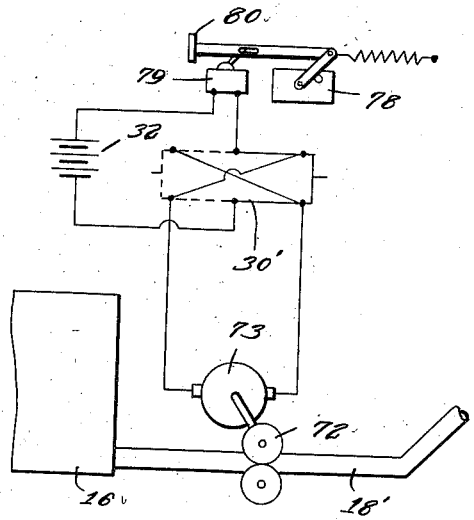
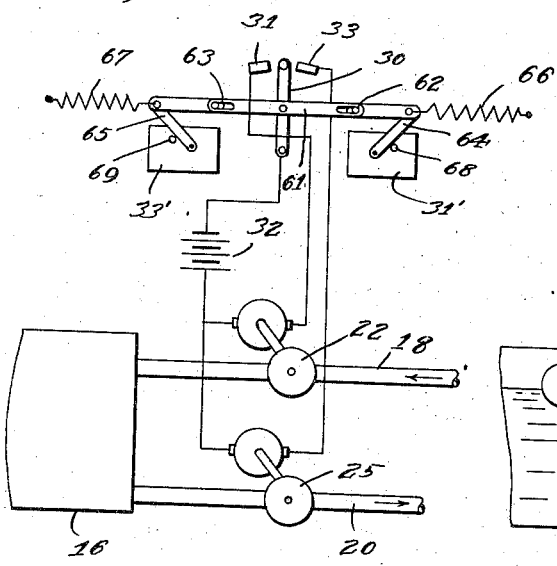
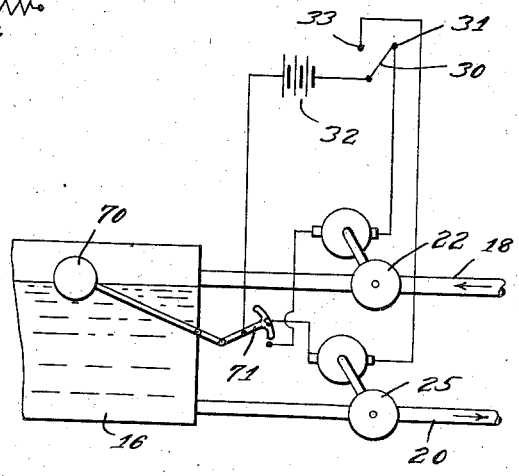

Patented Sept. 21, 1937

2,093,599

UNITED STATES PATENT OFFICE 2,093,599

WATER STORAGE AND CIRCULATING SYSTEM FOR MOTOR VEHICLES

Clarence Roy Clough, Freeport, Ill.

Application October 15, 1930, Serial No. 488,763

19 Claims. (Cl. 123—174)

This invention relates to motor vehicles and has particular reference to a new and improved water storage and circulating system.

Several attempts have been made to get around the troubles of winter-time driving by providing a suitable tank on the vehicle for the storage of the hot water from the radiator and engine during idle periods of the engine, the tank being suitably insulated so as to retain the heat long enough for ordinary idle periods and keep the water from freezing. However, it appears that the systems devised thus far have involved too many practical difficulties in the matters of ease of installation, positiveness in operation, and economy in production, which have prevented the adoption thereof by motor car manufacturers. It is, therefore, the principal object of my invention to provide a system of this kind in which the objections noted above are avoided so far as possible.

In the system of my invention a unitary structure is provided consisting of storage tank and pumps, all housed in a single shell or casing, and requires only pipe connections with the engine for the drainage and return of the water and can, therefore, be installed on a motor vehicle without any difficulty. The two pumps, one for drainage and the other for the return of the water are alternately operated and make it a very simple proposition to control the pumping of the water, the installation being also much more flexible by reason of such operation of the pumps. An automatic cut-off is preferably provided permitting the operation of the pumps only for a predetermined length of time sufficient to handle the water of the engine cooling system in draining and returning the water so that there is no danger of unnecessary discharge of the battery.

It is a further object of my invention to provide the tank of a vacuum type of double walled construction made with a view to economy in production and high thermal insulating efficiency, and to provide a compartment in the outer shell or casing to contain the pumps. It is also an object of my invention to provide pumps of the diaphragm type so as to be self-sealing.

In the following description reference is made to the accompanying drawings, in which—

Figure 1 is a plan view of an automobile chassis showing my improved system installed thereon;

Fig. 2 is a vertical section through the forepart of the automobile showing the engine and storage tank in side elevation and on a larger scale;

Figs. 3 and 4 are longitudinal sections through the storage tank taken vertically and horizontally;

Fig. 5 is a transverse section through the left hand portion of Fig 3;

Fig. 6 is an electrical wiring diagram;

Figs. 7 and 8 are similar diagrams, the former showing the use of an escapement mechanism to serve as an automatic cut-off, and the latter showing a float mechanism for the same purpose, and Figs. 9 and 10 are still other diagrams for a system modified to the extent of using a single pump with a reversible motor for the drainage of the water, Fig. 9 showing a float mechanism in connection with the motor for the automatic cut-off thereof, and Fig. 10 showing an escapement mechanism for a similar purpose.

Similar reference numerals are applied to corresponding parts throughout the views.

Referring for the time being to Figs. 1–6, the numeral 10 is applied in Figure 1 to the frame, and the numerals 11 and 12 designate the engine and its radiator. The engine has the usual upper and lower hose connections 13 and 14 establishing communication between the water jacket of the engine and the top and bottom of the radiator. 15 is the pump for circulating the water in the cooling system. In accordance with my invention, a storage tank, designated generally by the reference numeral 16, is mounted on the frame 10, being attached to the same by bands 17 or in any other suitable manner, and has a pipe 18 establishing communication between the top of the tank and a drain connection or sump 19 of the engine cooling system, and another pipe 20 establishing communication between the lower end of the tank and the water jacket of the engine, preferably near the head thereof, as indicated at 21. The pipe 18 is for the drainage of the water from the cooling system into the tank, and the pipe 20 is for the return of the water from the tank to the cooling system. Leaving out of consideration for the time being the means for pumping the water through pipe 18 for drainage and through pipe 20 for return, and assuming that the tank 16 is a suitably insulated heat retaining tank, it is evident that the hot water from the engine and radiator may be drained through pipe 18 to the tank 16 for storage in the latter while the engine is idle, and that the tank will keep the water from freezing during any ordinary idle period, or if the engine is thrown back into operation soon thereafter the water will be returned through the pipe 20 to the engine and radiator with very little loss of temperature so that the starting of the engine is accordingly facilitated, and the engine functions properly from the start without a lot of choking. The use of so-called anti-freeze solutions is, therefore, unnecessary and that obviates the necessity of frequent testing and checking of the strength of the solution, and there is also no further danger of damage to the engine or radiator due to freezing of the cooling fluid.

The drain pipe 18 has communication with the tank 16 through a small pump 22, the suction side of which is indicated at 23 and the discharge side at 24. The pipe 20 has communication with the tank 16 through another small pump 25 whose suction side is indicated at 26 and discharge at 27. While the pumps 22 and 25 may be of any suitable electrically operated type, such that the operation thereof may be taken care of by the extension of cables 28 and 29 thereto, I prefer pumps of a diaphragm or sylphon type such as are now available as fuel pumps for the carburetors of automobiles. Examples of such pumps are shown in Patents 1,630,622 and 1,675,115. The electrical means for operation of the pumps may be of a vibratory or rotary type. The pumps herein shown happen to be solenoid operated, vibratory action, sylphon pumps, but, of course, electric motors could be substituted for the solenoids. From this much description it will be clear in Fig. 6 that, assuming that the circuit control is devoid of any automatic mechanism, such as that shown at 81, and there is a conductor, such as that indicated in dotted lines at 82, when the switch lever 30 is thrown to the left and makes contact at 31, a circuit is completed through the battery 32 of the car for the solenoid of pump 22 for drainage of the water from the cooling system through pipe 18 to the tank 16. On the other hand, when the lever 30 is thrown to the right and makes contact at 33, a circuit is completed through battery 32 for the solenoid of pump 25 for the return of the water from the tank 16 through pipe 20 to the cooling system. The pumps I contemplate using have a definite rated capacity of so many gallons per minute, as for example, three gallons per minute, thus permitting complete transfer of the water in either direction in approximately two minutes where the cooling system contains approximately six gallons. With that as a basis, it is obvious that an automatic cut-off, such as that shown at 81, may be provided to open the circuit after a predetermined period of operation of the pump. In the device 81 a bi-metallic thermostat 83 has a resistance coil 84 suitably insulated therefrom, as by asbestos, arranged to heat the same sufficiently in the course of say two minutes to retract the tooth 85 so as to release the push button 86 and allow the contact 87 to spring away from engagement with the contact 88 and thereby open the circuit and stop the pump. Thus, when contact is made at 31 or 33 with the switch lever 30, the button 86 must also be depressed before the pump 22 or 25 can operate, and whichever pump is started will continue to run only until the automatic cut-off 81 breaks the circuit. Any other suitable form of automatic cut-off may be provided. Two different forms are shown diagrammatically in the last sheet of drawings and will be discussed presently. In passing, it should be realized that while I have shown two pipes and two pumps, the invention is not limited to a system with that many inasmuch as a single pipe may be provided, like pipe 18, in connection with a single reversible gear pump driven, for example, by a reversible electric motor. Pumps suitable for this purpose and reversible motors for driving the same are readily available.

The tank 16 may, of course, be of any suitable or preferred type or construction. That herein shown is a vacuum type tank of double walled sheet metal construction and comprises an outer sheet metal shell or casing 34 made in two pieces joined together by longitudinal flanges 35 along opposite sides, suitably by welding. The end walls 36 and 37 are also each preferably made in two pieces dividing the same along the major axis thereof, the two pieces being peripherally flanged, as at 38, to fit snugly within the ends of the shell 34 for joining thereto, and being also flanged along their abutting edges, as at 39, to permit fastening the same together. It will be observed that the flanges 35, 38 and 39 are all outwardly projecting so that it is a simple matter to make the joints. A one-piece sheet metal partition wall 40 is provided in the shell 34 extending transversely thereof near one end so as to separate the tank compartment 41 from the pump compartment 42. The edges of the wall 40 are flanged as at 43 to fit snugly inside the shell 34 to be joined thereto as by welding. The inside of the pump compartment 42 is lined with asbestos or other suitable insulating material, as indicated at 44, so that any water in the pipe connections between the pumps and the tank will be protected from freezing. The pumps may be mounted on a suitable supporting bracket 45 provided in the compartment 42. The pumps are of such a construction that they never require any attention, such as lubrication, so that it is perfectly practical to mount the same in a compartment of the shell for the tank without making provision for having access thereto. The tank proper comprises an inner container 16' provided in the tank compartment 41. Said container has the side walls thereof formed in two parts having longitudinal abutting flanges 45' suitably joined together as by welding, and there are end walls 46 and 47 to complete the container. The wall 47 is made in one piece flanged peripherally as at 48 to fit in the end of the container and be joined thereto as by welding. The wall 46 is made in two parts which are flanged peripherally as at 49 to fit within the end of the container and also be joined thereto as by welding. The abutting edges of the two pieces are flanged as at 50 and joined together also by welding. Now, the inner container 16' is supported in spaced relation to the walls of the outer shell or casing 34 by means of channels 51 extending lengthwise inside the shell at opposite sides of the inner container alongside the outwardly projecting longitudinal flanges 45' provided on said container. At points spaced lengthwise of the container the flanges 45' have projecting lugs 52 projecting into the supporting channels 51 and seated therein in asbestos or other suitable insulating material 53. One or more similar lugs 54 are provided projecting from the flanges 50 on the end wall 46 of the inner container and received in a pocket 55 provided on the end wall 36, the same having asbestos or other suitable insulating material 56 therein to completely surround the lug. It is, therefore, clear that the inner container 16' is supported inside the shell 34 in spaced relation to the walls thereof and thoroughly insulated with respect thereto. A valve 57 is mounted in the end wall 36 of the shell 34 to permit evacuating the shell, to further thermally insulate the inside container with reference to the shell, so that when hot water is drained from the engine and radiator into the container 16', the heat is retained therein quite a long time and the water is kept from freezing long enough to meet ordinary requirements.

The discharge pipe connection 24 of the pump 22 has an extension 24' reaching through the end wall 47 of the inner container 16' to a point near the top of said container, and the suction pipe connection 26 of the pump 25 also has a similar extension 26' communicating with the inside of the container 16' at the bottom thereof. This facilitates the draining of the water from the cooling system into said container and permits return of all of said water. An air vent pipe 58 is entered through a hole 59 in the discharge pipe connection 24 and extended through the pipe 24' into the container. Another hole is made at 60 in the top wall of the shell 34 so that the other end of the vent pipe can have communication with the atmosphere. This arrangement of the vent pipe has obvious advantages.

As stated above, I contemplate providing an automatic cut-off for opening the circuit of the electrical means operating the pump, after a predetermined period of operation of said means, whereby to avoid any danger of unnecessary discharge of the car battery 32. Referring to Fig. 7, the switch lever 30 arranged to cooperate with the contacts 31 and 33, as above described, is associated with two escapement mechanisms 31' and 33' of the type commonly used on electric toasters. A bar 61 has pin and slot connections at 62 and 63 with links attached to levers 64 and 65. The latter are normally held in the positions shown by means of springs 66 and 67 but are arranged to be moved away from their stops 68 and 69 by movement of the lever 30, and then are arranged to return slowly to the stops as permitted by the escapement mechanisms. For example, if the lever 30 is thrown to the left to make contact at 31, the lever 64 is pulled away from its stop 68. The motor or other electrical means for the pump 22 is thrown into operation for drainage of the water from the cooling system to the tank through pipe 18. The escapement mechanism 31' allows the return of the lever 64 under the action of spring 66 slowly, and may be set to allow contact at 31 for say two minutes, which will be just long enough for the pump 22 to transfer all of the water from the cooling system to the tank. When the lever 30 is thrown to the right to make contact at 33, the motor or other electrical means for operating the pump 25 will have its operation timed in a similar way by the escapement mechanism 33'. In that way it is obvious that the control is automatic and the motorist does not have to attend to the shutting off of the pump when all of the water has been transferred in one direction or the other, and the battery is, therefore, protected against unnecessary discharge.

In Fig. 8, the cut-off consists of a float 70 arranged to operate a switch 71. The latter comprises an oscillating blade movable with respect to two spaced contacts preferably so formed and related that the blade may swing through a predetermined angularity while in engagement with either of said contacts, as required in the movement of the float 70. It is evident from the showing in this figure that when the switch 30 is thrown to the right to make contact at 31 for the electrical means operating the pump 22, the float 70 is at the bottom of the tank, but as the water is transferred by pump 22 to storage tank 16, the float gradually rises and when all of the water has been transferred, the float 70 is at the extremity of its travel at which point it operates the switch, breaking the circuit. On the other hand, when the switch 30 is thrown to the left to make contact at 33 for the electrical means operating the pump 25, the opposite action takes place; the float 70 is at the top of the tank and the pump will continue to operate until all of the water is removed from the tank, or until the float 70 reaches the bottom.

In Figs. 9 and 10 I have shown somewhat similar diagrams in which a single reversible gear pump 72 is indicated in connection with a single pipe line 18' and driven by a reversible electric motor 73. When the pump 72 is driven in one direction, the water is drained from the cooling system into the tank, and when the pump is driven in the opposite direction, the water is returned from the tank to the cooling system. In Fig. 9 two float chambers 74 and 75 are shown in the pipe line 18' at opposite sides of the pump, the chamber 74 being on the cooling system side, and the chamber 75 on the tank side of the pump. A double-throw switch 30' controls the circuit for the motor 73 and is shown in full lines in the position corresponding to the operation of the pump for draining the water from the cooling system into the storage tank. So long as there is water in the cooling system, the float in the float chamber 74 keeps the switch 76 closed and the motor 73 continues to operate, but when all of the water is drained from the cooling system, the float in the float chamber 74 drops to the position indicated, and the switch 76 is opened and the motor 73 stopped. When the switch 30' is thrown the other way, being the position indicated in dotted lines, to operate the motor 73 in the reverse direction for return of the water to the cooling system, the float in the float chamber 75 keeps the switch 77 closed until all of the water is withdrawn from the tank, whereupon the switch is opened and the motor stopped.

In Fig. 10 an escapement mechanism 78, similar to the escapement mechanisms 31' and 33', is provided in connection with a toggle switch 79 for returning the switch to open circuit position after a predetermined period of operation of the motor 73. The plunger 80 is arranged to be pulled at the same time that the switch 30' is closed in either of its two positions. This insures operation of the motor 73 in either direction for just enough time to take care of the complete transfer of the water to or from the storage tank.

It is believed the foregoing description conveys a clear understanding of the objects and advantages of my invention. While reference has been made to various specific details of construction and arrangement, it should be understood that the invention is not particularly limited thereto excepting only as necessitated by the state of the prior art. It is thought to be clear, for example, that while the switch for controlling the pump or pumps is described as a separate switch, the same might be connected with the ignition switch on the car for operation at the same time. In that way, when the ignition switch is turned on, the water would automatically be returned to the cooling system, following which the pump would be stopped automatically, and when the ignition switch is turned off, the water would automatically be drained from the cooling system, following which the pump would automatically be stopped. The appended claims have been drawn with a view to covering all legitimate modifications and adaptations.

I claim:

1. The combination with an engine having a water jacket, of a heat retaining water receptacle, two valveless conduits connecting said receptacle with the water jacket, one constantly communicating with the top of said receptacle for the drainage of the water from said jacket into said receptacle and the other constantly communicating with the bottom of said receptacle for the return of said water from said receptacle to said jacket, a separate water pump for each of said conduits, the one being arranged to be operated for drainage of the water to said receptacle, and the other being arranged to be operated for return of the water to said jacket, and manually operated means for selectively throwing either pump into operation.

2. The combination with an engine having a water jacket, of a water receptacle remote with reference to the engine, conduit means establishing communication between the water jacket and receptacle for the flow of water from one to the other, pumping means forming part of a single unit with said receptacle for pumping the water through said conduit means, a single heat retaining enclosure for the water receptacle and pumping means, and means independent of the engine for operating the pumping means whereby positively to transfer the water from the jacket to the receptacle when the engine is stopped and to return the water from the receptacle to the jacket subsequently for resumed operation of the engine.

3. The combination with an engine having a water jacket, of an insulated water storage receptacle, conduit means connecting the jacket with said receptacle for drainage of the water from the jacket into the receptacle and return thereof, pumping means associated with the conduit means for pumping the water to and from the receptacle independently of operation of the engine, and timing means for controlling the operation of the pumping means, whereby to allow the pumping means to operate for a sufficient time to transfer all of the water in one direction or the other.

4. The combination with an engine having a water jacket, of a storage tank remote with reference to said engine, the same having a water storage compartment therein and a pump compartment adjacent the same, conduit means leading from the water jacket to the pump compartment, pump means in said compartment connecting the conduit means with the water storage compartment, electrically operated means for operating said pump means provided in said compartment therewith, and means for controlling the circuit for the electrically operated means.

5. The combination with an engine having a water jacket, of a storage tank remote with reference to the engine, the same comprising a shell divided into two separate compartments, one for the water storage receptacle and the other for the water pumping means, a water storage receptacle in the first compartment insulated with reference to the shell, pumping means in the other compartment, the latter compartment being suitably insulated for protection of the pumping means, the pumping means having communication with the water storage receptacle, electrical means for operating the pumping means, whereby the same is arranged to operate independently of the engine for transferring the water to or from the storage receptacle, and conduit means providing communication between the water jacket and the pumping means.

6. A structure as set forth in claim 5 wherein the pumping means has a pipe connection with the storage receptacle opening into the latter at the top thereof, the structure including an air vent pipe extending through said pipe connection from the pump compartment into the storage receptacle, said vent pipe being extended through the wall of the shell for communication with the atmosphere.

7. A structure as set forth in claim 5 wherein the pumping means has a pipe connection extending from the pump compartment into the other compartment and communicating with the storage receptacle, the structure including an air vent pipe extending through said pipe connection from the pump compartment into the storage receptacle and communicating with the top of the latter, said vent pipe establishing communication with the atmosphere for the storage receptacle.

8. The combination with an engine having a water jacket, of a heat retaining water receptacle, conduit means establishing communication between the water receptacle and the water jacket for transfer of the water back and forth therebetween, pumping means for moving the water through said conduit means, electrical means for operating the pumping means, and an automatic cut-off for said electrical means whereby the same is arranged to operate only a predetermined length of time sufficient to transfer all of the water in one direction or the other.

9. The combination with an engine having a water jacket, of a heat retaining water receptacle, a drainage conduit and a return conduit establishing communication between the water jacket and the storage receptacle, a pump associated with each conduit, electrical means for operating each of said pumps, the one being arranged to be operated for drainage of the water to said receptacle and the other being arranged to be operated for return of the water to said jacket, and automatic cut-off means associated with the electrical means permitting the operation thereof for only a predetermined length of time sufficient for the transfer of all of the water in either direction.

10. A storage tank for the purposes described comprising a shell having a partition therein near one end thereof dividing the same into two compartments, a water storage receptacle disposed in the one compartment and insulated with respect to the shell, pumping means in the other compartment having communication with the storage receptacle, the said pumping means having conduit means leading thereto from the outside of the shell, and electrical means for operating the pumping means disposed therewith in the same compartment.

11. A tank as set forth in claim 10 wherein the pumping means has a pipe connection with the storage receptacle extending through the partition wall, the tank including an air vent pipe leading from the pump compartment through said pipe connection into the storage receptacle, said vent pipe establishing communication between the top of the storage receptacle and the atmosphere.

12. The combination with an engine having a water jacket, of a heat retaining water receptacle, two conduits connecting said receptacle with the water jacket, one constantly communicating with the top of said receptacle for the drainage of the water from said jacket into said receptacle and the other constantly communicating with the bottom of said receptacle for the return of said water from said receptacle to said jacket, a separate self-sealing water pump for each of said conduits, the one being arranged to be operated for drainage of the water to said receptacle and thereupon seal the receptacle from the drainage conduit, and the other being arranged to be operated for return of the water to said jacket and thereupon seal the return conduit from the receptacle, and manually operated means for selectively throwing either pump into operation.

13. The combination with an engine having a water jacket, of a heat retaining water receptacle, conduit means establishing communication between the water jacket and said receptacle, two electrically operated pumps, one for drainage of water from the jacket and the other for return of water to the jacket, an electrical circuit for said electrically operated pumps, and a two-position switch in said circuit so connected with said pumps whereby in one position to operate one pump to secure drainage and in the other position to operate the other pump to secure return of the water.

14. A structure as set forth in claim 13 including an automatic cut-off also connected in said circuit and arranged to interrupt the operation of the electrical means when the same has operated a predetermined length of time sufficient to transfer all of the water in one direction or the other.

15. The combination with an engine having a water jacket and a radiator connected with the latter, of a heat retaining water receptacle, a conduit connected with the bottom of the radiator and communicating with the top of the receptacle for drainage of water into the latter, another conduit communicating with the bottom of the receptacle and with the upper end of the jacket for return of the water, pumping means associated with said conduits for draining and returning the water, and a single heat retaining enclosure for the water receptacle and said pumping means.

16. A water storage and transfer unit of the character described comprising a water receptacle, conduit means extending therefrom, pumps forming part of a single unit with the receptacle for pumping fluid through said conduit means, motors directly coupled with the pumps to drive the same, a single heat retaining enclosure for the water receptacle and pumps together with the pump drive motors, and timing means for controlling the operation of said pumps whereby to allow the same to operate for a sufficient time to transfer all of the fluid out of or into the receptacle.

17. A water storage and transfer unit of the character described comprising a water receptacle, conduit means extending therefrom, pumps forming part of a single unit with the receptacle for pumping fluid through said conduit means, electric motors directly coupled with the pumps to drive the same, a single heat retaining enclosure for the water receptacle and pumps together with the pump and drive motors, and an automatic cut-off for said motors whereby the same are arranged to operate only a predetermined length of time sufficient to transfer all of the fluid out of or into the receptacle.

18. A water storage and transfer unit of the character described comprising a single heat retaining enclosure partitioned so as to provide two chambers therein, a water receptacle disposed in one of said chambers whereby the contents thereof is protected against freezing, conduit means extending from said receptacle into the other chamber and from said chamber out of said enclosure, and pump means communicating with said conduit means and disposed in the last mentioned chamber whereby water contained therein is likewise protected against freezing.

19. A water storage and transfer unit of the character described comprising a single heat retaining enclosure partitioned so as to provide two chambers therein, a water receptacle disposed in one of said chambers whereby the contents thereof is protected against freezing, conduit means extending from said receptacle into the other chamber and from said chamber out of said enclosure, pump means communicating with said conduit means and disposed in the last mentioned chamber whereby water contained therein is likewise protected against freezing, and motor means forming a unitary assembly with the pump means and serving to drive the same.

C. ROY CLOUGH.